United States Patent
Ferraud, Jr.

(10) Patent No.: US 6,884,159 B1
(45) Date of Patent: Apr. 26, 2005

(54) HOSE ASSEMBLY FOR CONDUITING AND DIRECTING AIR FROM AN AIR OUTLET VENT OF A VEHICLE TO VARIOUS LOCATIONS WITHIN THE VEHICLE

(76) Inventor: Robert Ferraud, Jr., 40700 Starlight La., Bermuda, CA (US) 92201

( * ) Notice: Subject to any disclaimer, the term of this patent is extended or adjusted under 35 U.S.C. 154(b) by 60 days.

(21) Appl. No.: 10/457,759

(22) Filed: Jun. 9, 2003

(51) Int. Cl.$^7$ .............................................. B60H 1/00
(52) U.S. Cl. ...................................... 454/119; 454/903
(58) Field of Search ................................ 454/903, 119, 454/127; 165/41, 42

(56) References Cited

U.S. PATENT DOCUMENTS

| | | | | |
|---|---|---|---|---|
| 2,824,575 A | * | 2/1958 | Rosen ........................... | 285/61 |
| 3,383,778 A | * | 5/1968 | Goodman ....................... | 34/90 |
| 3,916,639 A | * | 11/1975 | Atkinson ...................... | 62/239 |
| 4,478,052 A | * | 10/1984 | McDowell .................... | 62/244 |
| 5,092,395 A | * | 3/1992 | Amidzich ..................... | 165/41 |
| 5,095,942 A | * | 3/1992 | Murphy .................. | 137/561 A |
| 5,146,757 A | * | 9/1992 | Dearing .......................... | 62/61 |
| 5,355,694 A | * | 10/1994 | Morrow et al. ............... | 62/244 |
| 5,403,232 A | * | 4/1995 | Helm et al. .................. | 454/230 |
| 5,404,865 A | * | 4/1995 | Huls ........................... | 126/206 |
| 5,794,683 A | * | 8/1998 | Kutzner ....................... | 165/41 |
| 5,823,869 A | * | 10/1998 | Paturzo ....................... | 454/152 |
| 6,131,645 A | * | 10/2000 | Barr ............................. | 165/41 |

* cited by examiner

*Primary Examiner*—Derek S. Boles
(74) *Attorney, Agent, or Firm*—Goldstein Law Offices, P.C.

(57) ABSTRACT

A hose assembly for directing conditioned air from an air outlet vent of a vehicle's air conditioning system to various locations within the vehicle. The hose assembly comprises a boot which is selectively attachable to the vent, and a length of hose selectively attachable to the boot. The length of hose is divided into interconnecting segments which are selectively attachable to one another, thereby allowing a user to vary the overall length of the hose as desired. The terminal segment of the hose has a louver having a plurality of slats, and a handle in mechanical contact with the slats. Rotation of the handle changes the direction in which the slats point, and thereby allows the user to direct the conditioned air in any desired direction. The terminal segment has a mounting clamp for selectively attaching the hose to a projecting surface on the inside of the vehicle, in order to immobilize the hose at an optimal position.

8 Claims, 3 Drawing Sheets

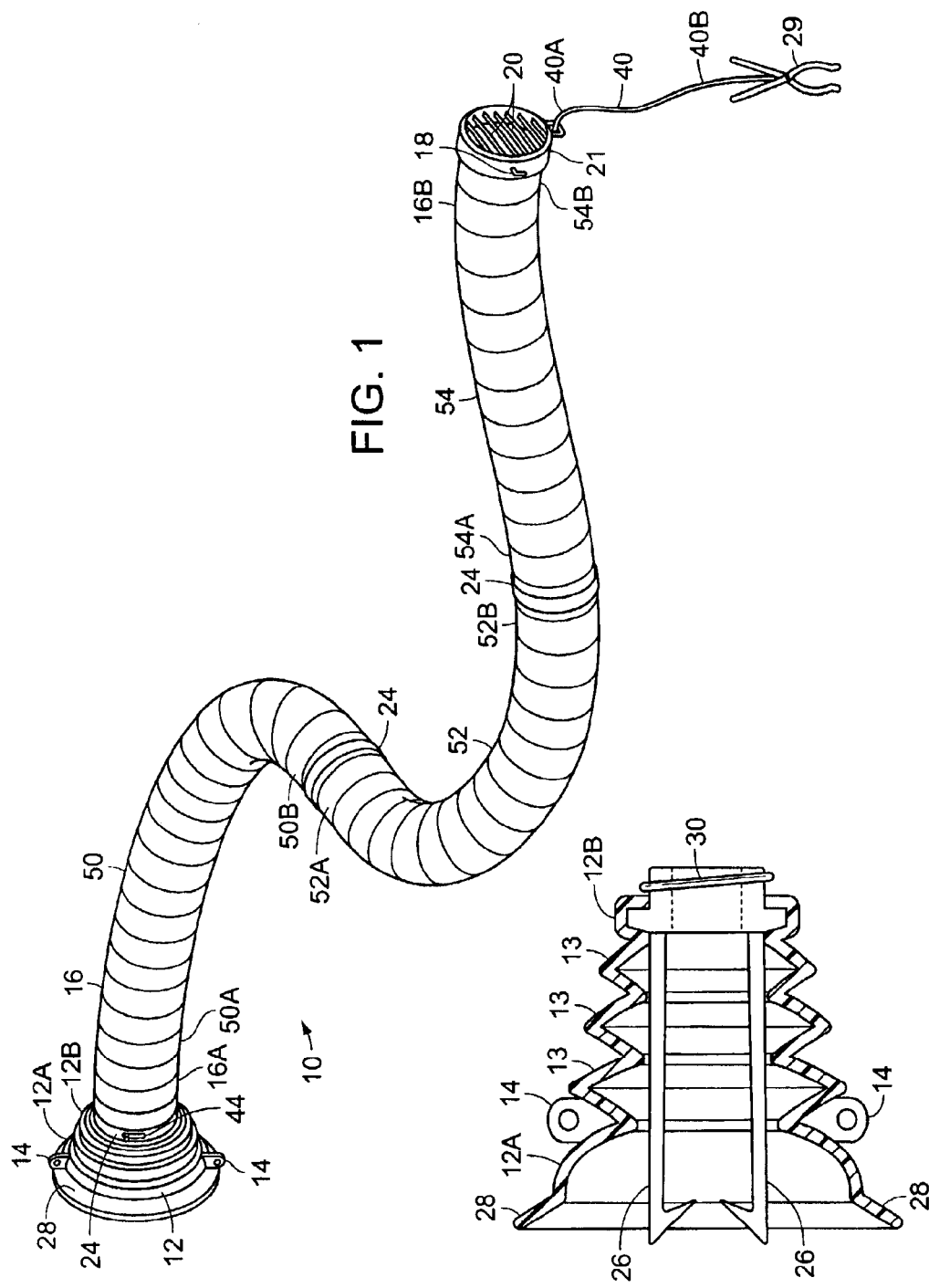

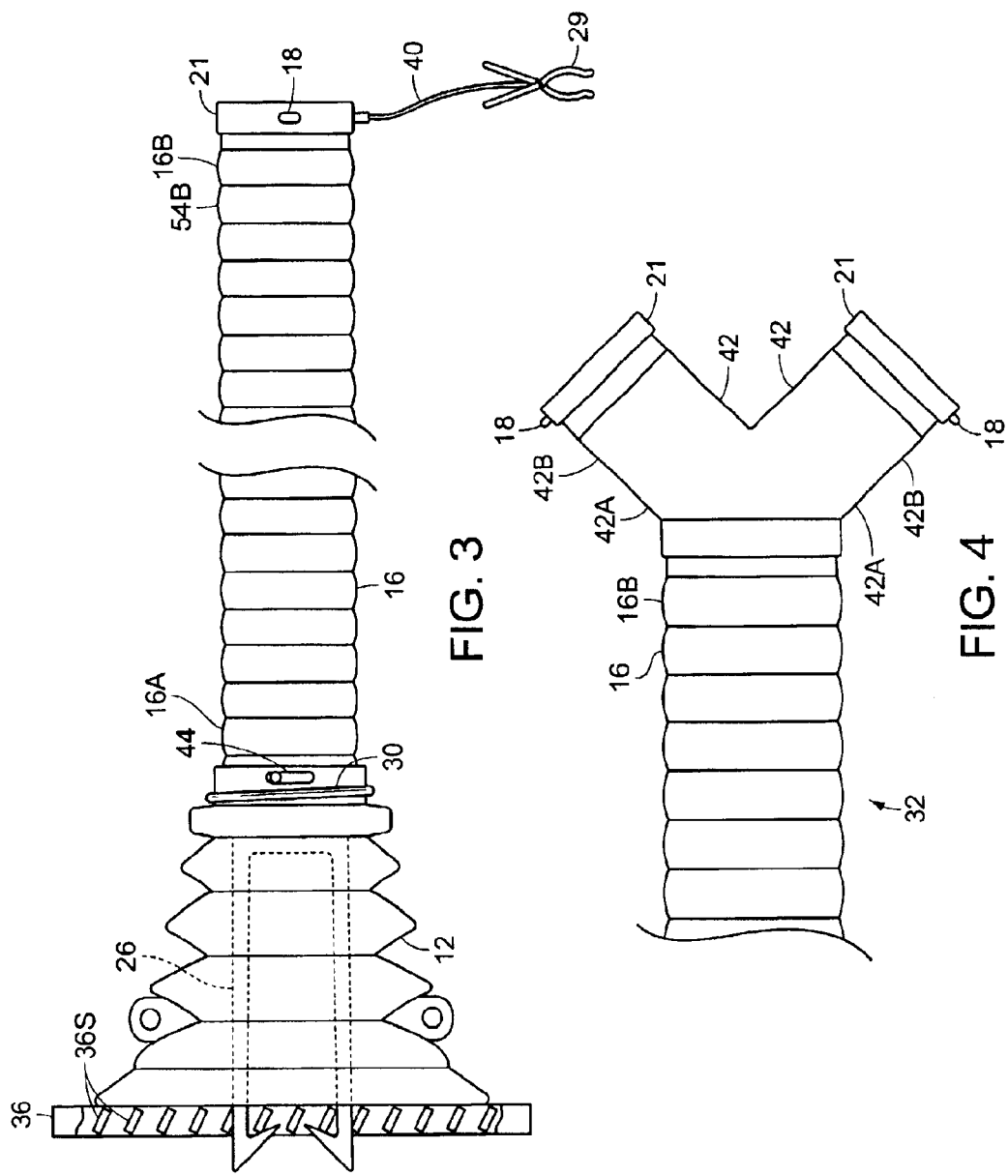

HOSE ASSEMBLY FOR CONDUITING AND DIRECTING AIR FROM AN AIR OUTLET VENT OF A VEHICLE TO VARIOUS LOCATIONS WITHIN THE VEHICLE

BACKGROUND OF THE INVENTION

1. Field of the Invention

The invention generally relates to a hose assembly, and in particular it relates to a hose assembly for conduiting conditioned air from an air outlet vent on a vehicle's dashboard to various locations within the vehicle.

2. Description of the Related Art

Most vehicles have air vents located on the dashboard, in the front of the vehicle. Such is well suited for distributing heated, cooled, and fresh air to the front seat occupants of the vehicle. Often, however, these vents are insufficient to maintain the comfort level of those seated in the rear of the vehicle.

A variety of devices are available for cooling various areas within a vehicle, using an air conditioning system of the vehicle. For example, U.S. Pat. No. 3,164,971 to Gentz appears to show a cooling device having an enclosure which is attachable to the air conditioning system using a flexible duct and an ice chamber. Additionally, U.S. Pat. No. 3,505,830 to Koerner appears to show a refrigerator that is cooled from a flexible conduit that is attached to the air outlet vent of a vehicle's air conditioning system. Furthermore, U.S. Pat. No. 5,794,683 to Kutzner appears to show a beverage cooler for a vehicle which is attachable to the air conditioning system of the vehicle by a flexible hose.

None of these devices appears to show a hose assembly having a boot which is selectively attachable to the air outlet vent of a vehicle's air conditioning system, further having a hose comprising interconnecting segments for directing conditioned air from the air outlet vent to various locations within the vehicle. While these devices may be suitable for the particular purpose employed, or for general use, they would not be as suitable for the purposes of the present invention as disclosed hereafter.

SUMMARY OF THE INVENTION

It is an object of the invention to produce a hose assembly capable of quickly and efficiently conduiting and directing conditioned air from a vehicle's air conditioning system to various locations within the vehicle—namely the rear of the vehicle. Accordingly, the hose assembly has a boot which is selectively attachable to an air outlet vent of the air conditioning system, and a length of hose which is selectively attachable to the boot. Conditioned air exiting the air outlet vent is quickly and efficiently directed by the hose to various locations within the vehicle. Other objects of the invention will become apparent in the detailed description of the invention that follows.

The invention is a hose assembly for directing conditioned air from an air outlet vent of a vehicle's air conditioning system to various locations within the vehicle. The hose assembly comprises a boot which is selectively attachable to the vent, and a length of hose selectively attachable to the boot. The length of hose is divided into interconnecting segments which are selectively attachable to one another, thereby allowing a user to vary the overall length of the hose as desired. The terminal segment of the hose has a louver having a plurality of slats, and a handle in mechanical contact with the slats. Rotation of the handle changes the direction in which the slats point, and thereby allows the user to direct the conditioned air in any desired direction. The terminal segment has a mounting clamp for selectively attaching the hose to a projecting surface on the inside of the vehicle, in order to immobilize the hose at an optimal position.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a perspective view of a hose assembly according to the present invention.

FIG. 2 is a cross-sectional view of a flexible boot of the hose assembly in a relaxed conformation, showing the opposed gripper hooks located therein which engage the louvers of the air vent.

FIG. 3 is a side view of the flexible boot of the hose assembly after selective attachment of the boot to an air outlet vent of a vehicle, with portions of the gripper hooks shown with hatched lines.

FIG. 4 is a side view of a Y-shaped splitter after selective attachment to a terminal segment of a hose of the hose assembly.

DETAILED DESCRIPTION OF THE PREFERRED EMBODIMENTS

Figure 5:
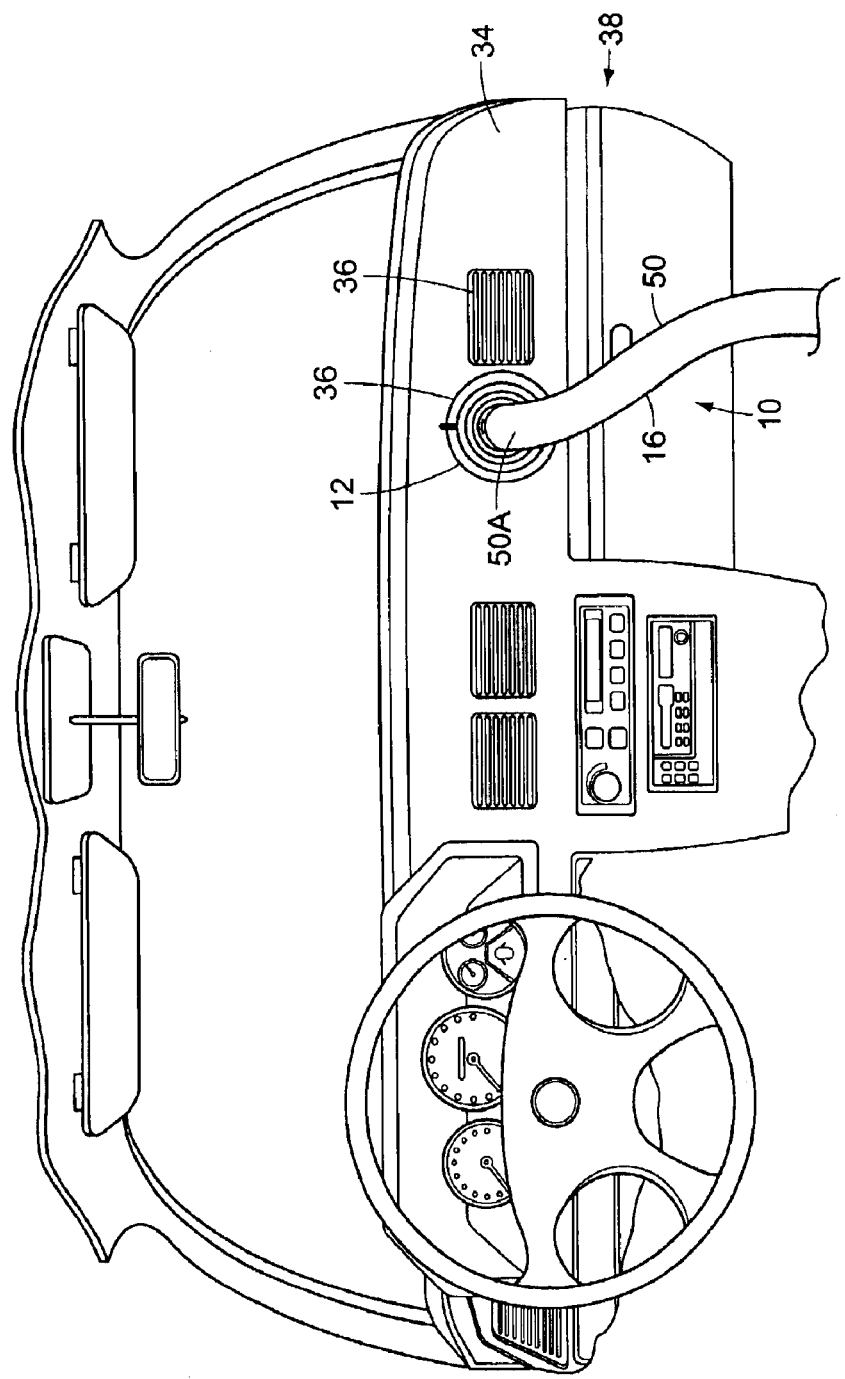
FIG. 5 is a perspective view of the boot of the hose assembly and an attached first segment of hose, after selective attachment of the hose assembly to an existing air outlet vent on a dashboard of a vehicle by engaging the gripper hooks to the louvers of the vent and extending the boot over the vent.

FIG. 1 illustrates a hose assembly 10, for use in conjunction with a vehicle. Referring momentarily to FIG. 5, the vehicle 38 has a dashboard 34 having at least one air outlet vent 36, for carrying or conduiting conditioned air from the air outlet vent to various locations within the vehicle 38. Returning to FIG. 1, the hose assembly 10 comprises a substantially hollow boot 12, having a first end 12A and a second end 12B, wherein each end 12A, 12B has an opening. Referring momentarily to FIG. 3, the first end 12A of the boot 12 has two gripper hooks 26 for selective attachment to the air outlet vent 36 on the dashboard. Returning to FIG. 1, the hose assembly 10 additionally comprises a flexible, hollow length of hose 16, having a first end 16A and a second end 16B, wherein each of the ends 16A and 16B has an opening. The first end 16A of the hose 16 is selectively attached to the second end 12B of the boot 12. When attached to the vehicle using the gripper hooks 26, the conditioned air exiting the air outlet vent 36 is conducted through the hose 16, and exits the opening at the second end of the hose 16B.

The length of hose 16 is divided into a first segment 50, an intermediate segment 52, and a terminal segment 54. The first segment 50 has a first end 50A and a second end 50B. Likewise, the intermediate segment 52 has a first end 52A and a second end 52B. Finally, the terminal segment 54 also has a first end 54A and a second end 54B. The first end 50A,52A, and 54A is the end of the segment 50,52, and 54, respectively, which is closer to the boot 12, after selective attachment of the first end 16A of the hose 16 to the boot 12. The first end 50A of the first segment 50 is selectively attachable to the second end 12B of the boot 12. The second end 50B of the first segment 50 is selectively attachable to the first end 52A of the intermediate segment 52. The second end 52B of the intermediate segment 52 is selectively attachable to the first end 54A of the terminal segment 54. Attachment of segments 50,52, and 54 to one another provides a hose 16 having a longer overall length, capable of reaching areas within the vehicle that are further from the air outlet vent. If a shorter overall length is required, one or more of the segments 50,52, or 54 may be omitted.

FIG. 5 illustrates the boot 12 of the hose assembly 10 and the first segment 50 of hose 16, being used in conjunction with the vehicle 38 wherein the boot 12 is mated with one of the air vents 36. The vehicle 38 has an existing air conditioning system which expels air through the air outlet vent 36 positioned on the dashboard 34. The first end 12A of the boot 12 has been selectively attached to the air outlet vent 36, as will be described in greater detail hereinafter.

As seen in FIG. 3, the air outlet vent 36 has a louver having a plurality of slats 36S. As seen in FIG. 2, the boot 12 has a pair of opposed gripper hooks 26 extending longitudinally within the boot 12 from the first end 12A for engaging the slats 36S. Advantageously, the hose assembly 10 attaches to the air outlet vent 36 by selectively engaging the slats 36S with the gripper hooks 26. The boot 12 has at least one finger hold 14, so that the boot 12 may be easily maneuvered during selective attachment to and detachment from the air vent 36 of the vehicle. The boot 12 has a flexible flange 28 at its first end 12A for preventing air exiting the air outlet vent 36 from leaking at the point at which the boot 12 is attached to the air outlet vent 36.

FIG. 3 illustrates the boot 12 after selective attachment of the boot 12 to the air outlet vent 36 of the vehicle, with portions of the grippers 26 shown with hatched lines. The hose 16 has been selectively attached to the boot 12. The gripper hooks 26 are being used for selectively engaging the slats 36S of the air outlet vent 36.

Turning momentarily to FIG. 4, the hose assembly 10 further comprises a substantially hollow Y-shaped splitter 32, used for selectively directing the conditioned air exiting the second end 16B of the hose 16 into two different pathways, in order to more precisely direct the air to particular locations within the vehicle. The Y-shaped splitter 32 has two arms 42 and a neck. In FIG. 4, the neck has been selectively inserted within and attached to the second end 16B of the hose 16, and is therefore obscured by the hose 16. The arms 42 each have a first end 42A closer to the neck and a second end 42B. The second end 42B of each of the arms 42 of the Y-shaped splitter 32 is selectively attachable to a branching segment of hose, in order that the stream of conditioned air may more efficiently reach areas within the vehicle that are far from the air outlet vent 36.

Returning to FIG. 1, the first end 50A,52A, and 54A of each of the segments 50,52, and 54, respectively, has a twist-lock connector 24. The twist-lock connector 24 on the first end 50A of the first segment 50 is used for selectively attaching the first segment 50 of hose 16 to the boot 12. Returning momentarily to FIG. 3, the boot 12 has a twist-lock ridge 30 for selectively engaging the twist lock connector 24 on the first end 50A of the first segment 50. The boot 12 also has a quick-release lever 44 in mechanical contact with the ridge 30. Partial rotation of the lever 44 causes the ridge 30 to disengage the adjoining twist lock connector 24, and thereby allows rapid detachment of the first segment 50 from the boot 12. The twist-lock connector 24 on the remaining segments 52,54 are each used for selectively attaching each of said segments 52,54 to the adjoining segment. The second end 50B,52B of the segments 50,52, respectively, each have a twist-lock ridge and an associated quick-release lever, for selectively engaging the twist-lock connector 24 of the adjoining segment. The second end 54B of the terminal segment 54 of the hose 16 has a louver 21 having a plurality of parallel slats 20 for directing air which exits the terminal segment 54 in a particular direction. The louver 21 has a handle 18 in mechanical contact with the slats 20. Rotation of the handle 18 by the user changes the direction in which the slats 20 point, so that air may be directed as desired by the user. The louver 21 is selectively detachable from the second end 54B of the terminal segment 54 in order to allow the Y-shaped splitter 32 to be selectively inserted within the second end 54B of the terminal segment 54. The second end 54B of the terminal segment 54 has a flexible, rubber-coated wire 40 having a first end 40A and a second end 40B, wherein the first end 40A of the wire 40 is attached to the terminal segment 54, and wherein the second end 40B is attached to a mounting clip 29. The mounting clip 29 is used for selectively attaching the length of hose 16 to a projecting portion of the inside of the automobile.

Returning to FIG. 4, the second end 42B of each of the arms 42 of the Y-shaped splitter 32 has a selectively attached extension louver 21 having extension slats and an extension louver handle 18, also for directing the flow of conditioned air to desired locations within the vehicle from the extension louver 21.

Returning to FIG. 2, the boot 12 comprises a plurality of concentric segments 13, each constructed from malleable rubber. The segments 13 closer to the first end 12A of the boot 12 have a wider inner and outer diameter. The boot 12 has a compressed conformation wherein the concentric segments 13 are partially telescopically compressed with respect to one another. Additionally, the boot 12 has a relaxed conformation wherein the concentric segments 13 are expanded with respect to one another. The boot 12 assumes the compressed conformation when the grippers 26 of the boot 12 engage the slats 36S of the air outlet vent 36. The boot 12 assumes the relaxed conformation when the grippers 26 are detached from the slats 36S of the air vent 36.

In use, the first end 50A of the first segment 50 of the hose 16 is selectively attached to the second end 12B of the boot 12. The second end 50B of the first segment 50 is selectively attached to the first end 52A of the intermediate segment 52. The second end 52B of the intermediate segment 52 is selectively attached to the first end 54A of the terminal segment 54. Attachment of the segments 52 and 54 provides a hose 16 capable of reaching locations within the vehicle that are further away from the air outlet vent.

The first end 12A of the boot 12 is then firmly attached to the air outlet vent 36 by selectively engaging the slats 36S of the air outlet vent 36 with the gripper hooks 26 of the boot 12. The air conditioning system of the vehicle is turned on. The length of hose 16 is positioned within the vehicle so that the second end 16B of the hose 16 is in proximity to the area within the vehicle that is to receive the conditioned air exiting the second end 16B of the length of hose 16. The user may utilize the extension louver handle 18 to change the direction in which the slats 36S point, in order to direct the air exiting the second end 16B of the hose 16 towards a particular location within the vehicle. The user selectively attaches the mounting clip 29 to a projecting portion of the vehicle interior, in order to position the hose 16 at a desired location.

If a hose 16 having a longer overall length is needed to reach an area within the vehicle, the user selectively attaches the neck of the Y-shaped splitter 32 to the second end 16B of the hose 16, after detaching the louver 21 from the second end 54B of the terminal segment 54. The user may then selectively attach one of the branching hoses to the second end 42B of each of the arms 42, in order to better direct the stream of conditioned air from the vent to particular locations within the vehicle.

In conclusion, herein is presented a hose assembly for conduiting air from the air outlet vent on an automobile dashboard to various locations within the vehicle. The invention is illustrated by example in the drawing figures, and throughout the written description. It should be understood that numerous variations are possible, while adhering to the inventive concept. Such variations are contemplated as being a part of the present invention.

What is claimed is:

1. A hose assembly, for use in conjunction with a vehicle having a dashboard having an air outlet vent, comprising:
    a substantially hollow boot, having a first end and a second end, each end of the boot having an opening, wherein the first end of the boot is selectively attachable to the air outlet vent on the dashboard;
    a flexible, hollow length of hose, having a first end and a second end, each end of the hose having an opening, wherein the first end of the hose is selectively attachable to the second end of the boot, and wherein air which exits the air outlet vent is conducted through the hose, and exits the second end of the hose through the opening at the second end of the hose, wherein the vehicle air vent has a louver having slats, wherein the boot has a pair of opposed gripper hooks extending longitudinally through the boot and selectively protruding through the first end of the boot for selectively engaging the slats of the air vent, in order to secure the hose assembly to the air vent, wherein the length of hose comprises a first segment of hose and a terminal segment of hose, each segment having a first end and a second end, wherein the first end of the first segment is selectively attachable to the second end of the boot, wherein the second end of the first segment is selectively attachable to the first end of the second segment, thereby providing a longer hose, capable of reaching areas within the vehicle that are further from the air outlet vent;
    a Y-shaped splitter for directing the conditioned air which exits the vent into two different pathways, in order to more precisely direct the air to particular locations within the vehicle, said Y-shaped splitter having two arms and a neck, wherein each of the arms has a first end closer to the neck and also a second end, wherein the neck is selectively attachable to the second end of the terminal segment of hose;
    an intermediate segment of hose having a first end and a second end, wherein the first end of the intermediate segment is selectively attachable to the second end of the first segment, and wherein the second end of the intermediate segment is selectively attachable to the first end of the terminal segment, thereby providing a longer hose, capable of reaching areas within the vehicle that are further from the air outlet vent; and
    two branching segments of hose, wherein the second end of each of the arms of the Y-shaped splitter is selectively attachable to one of the branching segments of hose, in order that the conditioned air exiting the vent is more efficiently directed to particular locations within the vehicle, wherein the boot has at least one finger hold, so that the boot may be easily maneuvered during selective attachment to and detachment from the air vent of the vehicle, wherein the boot has a flexible flange at its first end for preventing air which exits the air outlet vent from leaking at the point of contact between the boot and the air outlet vent, wherein the first end of each of the segments of hose has a twist-lock connector, wherein the second end of the boot and the second end of the first segment and the intermediate segment each have a twist lock ridge, wherein the twist-lock connector on the first segment of hose selectively engages the twist lock ridge on the second end of the boot, and thereby selectively attaches the first segment of hose to the boot, and wherein the twist-lock connector on the remaining segments of hose are each used for selectively engaging the twist-lock ridge on the adjoining segment of hose, thereby selectively attaching each of said segments to each other.

2. The hose assembly as recited in claim 1, wherein the terminal segment of the hose has an extension louver having extension louver slats for directing air which exits the terminal segment in a particular direction.

3. The hose assembly as recited in claim 2, wherein the extension louver has an extension louver handle in mechanical contact with the extension louver slats, wherein rotation of the extension louver changes the direction in which the extension louver slats are oriented, so that conditioned air may be directed as desired by the user.

4. The hose assembly as recited in claim 3, further comprising a mounting clip attached to the terminal segment of the hose, for selectively attaching the length of hose to any projecting portion inside of the automobile.

5. The hose assembly as recited in claim 4, wherein the boot comprises a plurality of concentric segments, each constructed from malleable rubber, wherein the segments closer to the first end of the boot have a wider inner and outer diameter, said boot having a compressed conformation wherein the concentric segments are partially telescopically compressed with respect to one another, said boot also having a relaxed conformation wherein the concentric segments are partially telescopically expanded with respect to one another, wherein the boot assumes the compressed conformation when the grippers of the boot engage the slats of the air vent, and wherein the boot assumes the relaxed conformation when the grippers are detached from the slats of the air vent.

6. A method of using a hose assembly in conjunction with a vehicle having an air conditioning system having an air outlet vent, for directing conditioned air from the air outlet vent to various locations within the vehicle, said hose assembly having a boot having a first end and a second end, said hose assembly also having a length of hose having a first end and a second end, said method comprising the steps of:
    a) attaching the first end of the length of hose to the second end of the boot;
    b) attaching the first end of the boot to the air outlet vent;
    c) positioning the length of hose within the vehicle so that the second end of the hose is directed toward the area within the vehicle that is to receive the conditioned air;
    d) turning on the air conditioning system of the vehicle;

e) conduiting air from the air vent to the second end of the hose; and f) expelling air from the second end of the hose into the area in the vehicle in proximity to said second end of the hose, wherein the length of hose comprises a first segment of hose, an intermediate segment of hose, and a terminal segment of hose, each having a first end and a second end, wherein the method further comprises the step of attaching the second end of the first segment to the first end of the intermediate segment, and selectively attaching the second end of the intermediate segment to the first end of the terminal segment, thereby providing a hose which is capable of reaching locations within the vehicle that are further away from the air outlet vent, wherein the air outlet vent of the vehicle has a louver having a plurality of slats, wherein the boot further has a pair of gripper hooks extending longitudinally through the boot, and wherein the step of attaching the first end of the boot to the air outlet vent comprises attaching the first end of the boot to the vent by selectively engaging the slats of the air outlet vent with the gripper hooks, wherein the hose assembly further comprises a substantially hollow Y-shaped splitter and two additional lengths of branching hose, said Y-shaped splitter having two arms and a neck, wherein each of the arms has a first end closer to the neck, and also a second end, said method further comprising the steps of:

a) attaching the neck to the second end of the terminal segment of hose; and b) attaching one of the branching hoses to the second end of each of the arms, wherein the step of expelling air from the second end of the hose further comprises thereby directing said air in two different pathways, each from the Y-shaped splitter arms, wherein the first end of each of the segments of hose has a twist-lock connector, wherein the second end of the first segment, the intermediate segment, and the boot each have a twist lock ridge, wherein the step of selectively attaching the first segment of hose to the second end of the boot comprises attaching the twist-lock connector on the first segment of hose to the twist lock ridge on the second end of the boot, and wherein the step of selectively attaching each of the remaining segments of hose to the adjoining segment of hose comprises attaching the twist-lock connector on the segments of hose to the twist lock ridge on the adjoining segment of hose.

7. The method of using a hose assembly as recited in claim 6, wherein the terminal segment of the hose has an extension louver having extension louver slats, and wherein the extension louver has an extension louver handle in mechanical contact with the extension louver slats, said method further comprising the step of manipulating the extension louver handle to change the direction in which the extension louver slats are directed, in order to direct the air which exits the terminal segment towards a particular location within the vehicle.

8. The method of using a hose assembly as recited in claim 7, wherein the hose assembly further comprises a mounting clip attached to the terminal segment of the length of the hose, wherein the step of positioning the second end of the hose within the vehicle comprises attaching the mounting clip to a projecting portion of the inside of the automobile, in order to immobilize the hose at a particular position within the vehicle.

* * * * *